United States Patent [19]
Spodig

[11] 3,829,805
[45] Aug. 13, 1974

[54] APPARATUS FOR MAGNETICALLY SUPPRESSING OSCILLATIONS

[76] Inventor: Heinrich Spodig, Netteberge 84, 4711 Bork, Westfalen, Germany

[22] Filed: Nov. 8, 1972

[21] Appl. No.: 304,759

[30] Foreign Application Priority Data
Nov. 9, 1971  Germany............................ 2155532

[52] U.S. Cl................................. 335/289, 335/295
[51] Int. Cl. ............................................. H01f 7/20
[58] Field of Search..................... 335/289, 290, 295

[56] References Cited
UNITED STATES PATENTS
| | | | |
|---|---|---|---|
| 2,348,967 | 5/1944 | Duby................................. | 335/290 |
| 3,111,607 | 11/1963 | Storch.............................. | 335/290 X |
| 3,389,356 | 6/1968 | Schneider....................... | 335/295 X |
| 3,389,358 | 6/1968 | Tubbs................................ | 335/290 |

*Primary Examiner*—George Harris
*Attorney, Agent, or Firm*—Michael S. Striker

[57] ABSTRACT

Oscillations and vibrations in a machine tool are suppressed by magnets generating a magnetic flux flowing through a stationary part and a movable part of the machine tool. The portions of the magnets from which concentrated magnetic flux emanates, are not in contact with the stationary and movable parts, and are spaced by an air gap from the magnet housing.

18 Claims, 10 Drawing Figures

PATENTED AUG 13 1974 3,829,805

PATENTED AUG 13 1974 3,829,805

APPARATUS FOR MAGNETICALLY SUPPRESSING OSCILLATIONS

BACKGROUND OF THE INVENTION

The present invention relates to an apparatus and method for improving oscillation and damping characteristics of machine tools, such as grinding machines, drilling machines, milling machines and other machines with movable supports and carriages.

In machines of this type, it is known to use magnetic rollers having magnetic adhesion on the peripheral surface thereof which is in direct magnetically adhering contact with movable parts of a machine in order to assist in dampening oscillations and vibrations of the movable parts. Non-homogeneous, magnetic outer stray fields on the peripheral surface of the rollers are used, while the rollers are in contact with the movable machine parts only along a line. Such line contact is little suitable for producing a great magnetic adhesion force, as compared with an arrangement in which the surface of a magnet has a large area for radiating magnetic flux. Furthermore, due to induction caused by the roller magnets, the magnetic efficiency is not satisfactory in the constructions of the prior art.

The small magnetic rollers according to the prior art, were only little successful in damping oscillations and vibrations of machine tools due to the small magnetic adhesion. When the rollers slip on the movale machine parts directly engaged thereby, small magnetized chips are produced by the wear of the surfaces, which gradually cause damage to the rollers and to the machine parts. It has been found that magnetic rollers in direct contact with the movable part of the machine were incapable of improving the oscillation and damping characteristics of the machines.

For the problem of the present invention, in addition to the state of the magnetic art, also the state of the oscillation and vibration art is of importance, since several factors influence the vibration and oscillation properties of a machine, such as a machine tool. For example:

a. the rigidity of the elastic system formed by the machine bed, carriages, and the influence of other constructive features in the damping region of the force flux;

b. the rigidity and damping potential of the drive means, such as a motor, gear transmission, screw spindle, and the rack bar;

c. the working movement between tool and workpiece in the event of great static and dynamic loads, and furthermore the quality of the tool, and the chemical composition, hardness, and toughness of the material of the workpiece.

Requirements regarding precision of a machine tool, particularly for precise shaping and measuring tolerances of the workpieces have been increased recently, while at the same time the static and dynamic loads on the machines have been increased. Irrespective of the greatly increased output of modern machine tools, there are always weak points in the machines which cause a stronger deformation of parts whereby the oscillation properties of the machine are detrimentally affected. In order to eliminate self-excited or forced oscillations or vibrations of the machine, additional apparatus such as oscillations suppressors, oscillation dampers, dynamically improved bearings, improved reinforcements, and ribs formed in the parts have been developed and used. The measures for avoiding the undesired oscillations, can be divided into three main groups as follows:

1. obtaining the maximum static and dynamic rigidity due to the basic construction of the machine tool;

2. the provision of vibration suppressors and oscillation dampers; and 3. mounting the entire machine on insulating elements or insulating foundations, again supported on insulating elements, and being selected and constructed in accordance with the machine.

SUMMARY OF THE INVENTION

It is one object of the invention to overcome the disadvantages of known apparatus for suppressing oscillations and vibrations in machines, which is free of the disadvantages of the prior art.

Another object of the invention is to use a new approach to the suppression of oscillations in machine tools by magnetic means.

With these objects in view, the present invention provides an apparatus and method for improving the oscillation and damping characteristics of machine tools, such as grinding, drilling, milling and like machines provided with movable supports and carriages. In accordance with the invention, the movable and stationary parts of the machine are subjected to a contact-free magnetic attraction by a magnetic field concentrated to maximize flux density. Magnets are combined to form a magnetic system producing an adhesive force acting on the movable and stationary parts of the machine. The magnets can be either electrically or mechanically rendered operative and inoperative, and may be mounted in the stationary part of the machine, such as the machine bed, or in the movable part of the machine, for example on a working table. The part of the machine which is not provided with magnets, is advantageously provided with a magnetizable armature plate between which and the magnetic system, a strong magnetic field develops in the air gap, which attracts, without being in direct contact, magnetically corresponding parts.

With magnetic systems producing magnetic adhesive forces, high flux densities, which are practically homogeneous, can be obtained, which almost reach the true values of remanence, and which can produce correspondingly large magnetic pulling forces. The adhesion causing magnetic pulling forces, which can be increased to almost double value with the use of high quality magnetic steels, increase the dynamic rigidity of the working table, and reduce the dynamic yielding accordingly, and in the same way also the static rigidity of the machine bed is increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
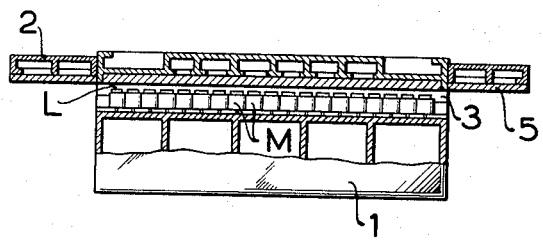
FIG. 1 is fragmentary schematic view, partially in section, illustrating a first embodiment of the invention provided in a machine tool.
Figure 2:
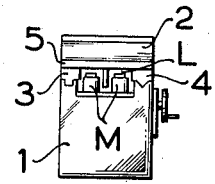
FIG. 2 is a side elevation of FIG. 1.
Figure 3:
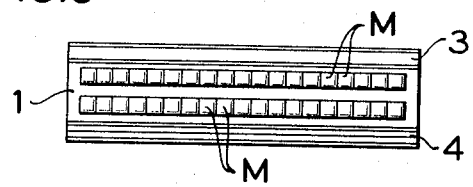
FIG. 3 is a plan view illustrating the machine bed of FIG. 1.

FIGS. 1, 2 and 3 illustrate an experimental embodiment which includes a box-shaped machine bed 1 with supporting and guide means for a machine table 2 which is driven by a worm drive and a rack bar. The guide means for table 2 can be constructed as guide rails 3 and 4 in the conventional manner so that the machine table can move on the machine bed 1. Magnets, preferably permanent magnets, are combined in a magnetic means M, and cooperate with ferromagnetic parts. The magnetic means are either provided with windings which are connected by switch means, not shown, to a voltage source, or can be mechanically activated and deactivated by displacing systems of permanent magnets, which have a common magnetic field when energized, singly or in groups relative to each other so that the corresponding magnet poles cooperate with each other and short circuit the magnetic field.

In the grinding machine shown in FIGS. 1 to 3, a system of magnetic means M is built into a recess in the machine bed 1. The working table 2 is provided with an armature plate 5 in the region cooperating with the magnetic means M during movement of the machine table 2. The magnetic means M and the armature plate 5 confront each other, but are not in contact with each other, and form a working air gap L in which the magnetic flux field of the magnetic field M is concentrated.

The parts of the machine bed 1 and working table 2, which are not in contact, and which are caused to oscillate and vibrate during working operations, are in this manner subjected to a strong magnetic attraction so that the working table 2 is firmly pressed onto the guide rails 3 and 4, so that its dynamic rigidity is substantially increased, and the dynamic yielding correspondingly reduced, while at the same time the static rigidity of the machine bed 1 is increased by the magnetic adhesion forces. Depending on the magnitude of the system of magnetic means M, for example the number of magnetic units therein, and depending on the width of the working air gap L, which may be obtained by adjusting the position of the armature plate 5 toward and away from the magnetic means M, adhesive magnetic forces between 12 and 25 Mp can be produced. In this manner, it is possible to improve the static and dynamic rigidity of the machine as required. Due to the improvement of the vibrations and oscillations by the present invention, the machine tool can be mounted on the floor without a foundation, and no additional mechanical oscillation damping apparatus is required.

Due to the fact that no special foundations need be provided for the machine, the position of the machine can be freely selected, and the machine with the oscillation suppressing magnetic system of the invention can be anywhere placed without anchoring on concrete or other floors, and transferred to another position if required for cooperation of several machines in a specific operation requiring sequential operations on the same workpiece. It is therefore not necessary to consider the machine tool as an absolutely stationary machine.

It is evident that the arrangements shown in FIGS. 1 to 3 can be reversed, and that the magnetic means M can be mounted in the machine table 2 and cooperate with magnetizable parts, such as an armature plate 5, on the machine bed 1.

A system of magnetic means M may consist of magnetic units, arranged in a row adjacent each other, and be activated, or inactivated, in groups or all together, for example, by a conventional electric circuit, not shown.

Figure 4:
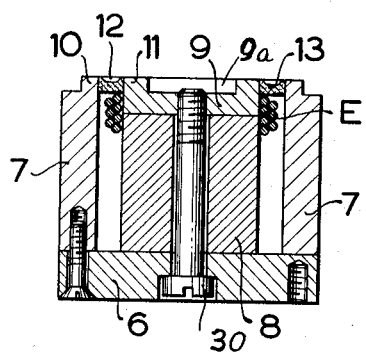
FIG. 4 is a cross-sectional view illustrating a magnetic unit of the magnetic means of FIG. 1.
Figure 5:
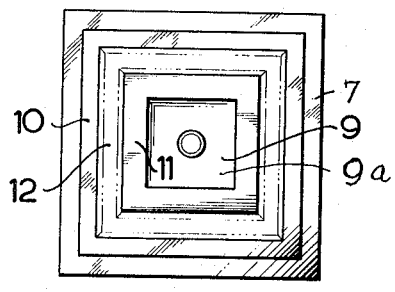
FIG. 5 is a plan view of the magnetic unit shown in FIG. 4.

As shown in FIGS. 4 and 5, each magnetic unit includes a housing having a bottom plate 6 and a side wall means 7, and a permanent magnet 8 secured to the center of the bottom plate 6 by a screw 30 whose threaded end is threaded into the pole shoe 9 on top of the permanent magnet 8. An exciting winding E surrounds permanent magnet 8 so that the same can be energized and de-energized.

The pole shoe 9 has a ridge or flange 11 around its upper end bounding a center recess 9a, as seen in FIG. 5. The upper rims of the side walls 7 are stepped and have ridges or flanges 10 whose top face is located in the same horizontal plane as the top faces of the ridges 11.

Between the ridge 10 and the ridges 11, an air gap 12 is located, which is closed by a non-magnetic substance 13. The exciting winding E on the permanent magnet 8 is energized and de-energized by current pulses which may be produced by an ignitron.

As noted above, the activation and deactivation of the permanent magnets may also be obtained by mechanical means, similar to the manner of permanent magnetic chuck plates. A substantially cubed-shaped magnetic unit is shown in FIGS. 4 and 5, and it will be understood that a cylindrical unit could also be used.

Figure 6:
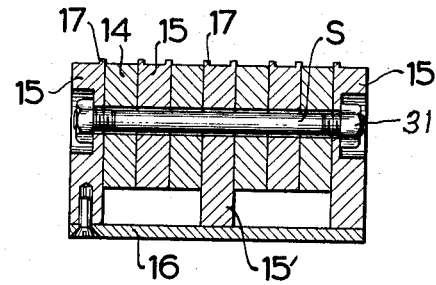
FIG. 6 is a cross-sectional view illustrating a modified magnetic means according to the invention.
Figure 7:
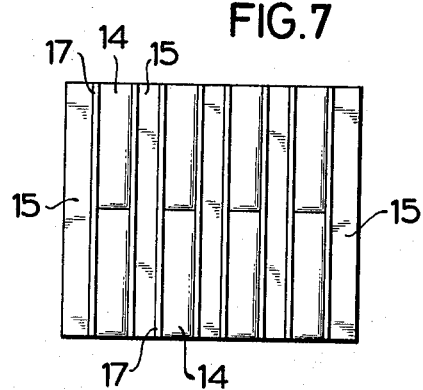
FIG. 7 is a plan view of the embodiment of FIG. 6.

Another embodiment of the invention is illustrated in FIGS. 6 and 7, and may be used, arranged in rows, in the machine shown in FIGS. 1 to 3. Each magnetic unit includes a bottom plate 16, side walls 15, and a stack of alternating ferromagnetic plates 15 and permanent magnetic plates 14. A bolt S with a nut 31 penetrates the plates 14 and 15, and holds the unit together. The housing including the outermost ferromagnetic plates 15 as side walls and the bottom plate, 16 provide a path for the magnetic return flux. Additional ferromagnetic plates 15 can be used for the path of the flux, for example, the central ferromagnetic plate 15' forms part of the flux path and abuts the bottom plate 16. The ferromagnetic plates 15 have ridges or flanges 17 on the sides adjacent the permanent magnet plates 14 so that the magnetic flux is concentrated.

Figure 8:
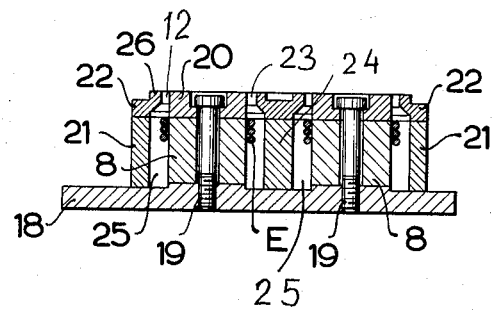
FIG. 8 is a cross-sectional view illustrating another embodiment of the invention.
Figure 9:
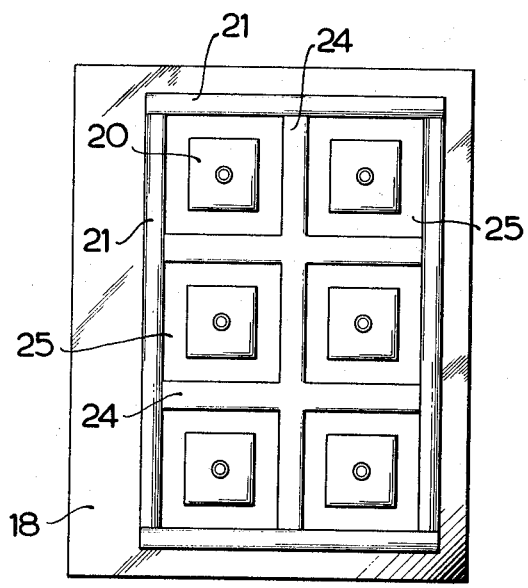
FIG. 9 is a plan view of the embodiment of FIG. 8.
Figure 10:
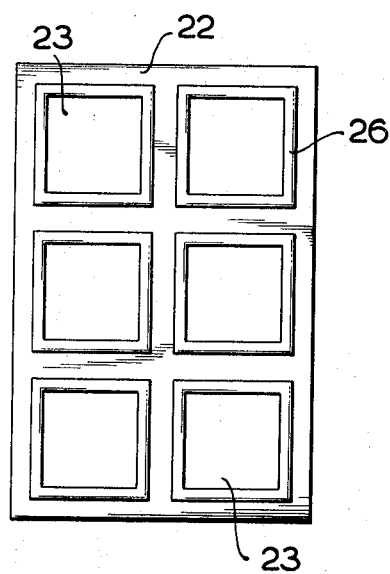
FIG. 10 is a plan view of a cover plate used in the embodiment of FIGS. 8 and 9.

In the embodiment of the invention shown in FIGS. 8 to 10, six magnetic units are combined. An angular housing is provided in which two rows of permanent magnets 8 are mounted. Screws 19 secure each permanent magnet 8, and the corresponding pole plate 20, to the bottom wall 18 of the housing which has side walls 21 also secured to the bottom wall 18. The side walls 21 support a cover plate 22, shown in FIG. 10. The cover plate covers the open top of the housing and has six cutouts 23, corresponding to the six permanent magnets 8 and pole shoes 20, and surrounded by a ridge or flange 26 which serves for radiating concentrated flux. The area of the cut-outs is so large that an air gap 12 is formed between ridge 26 and the respective pole shoe 20. Partitioning walls 24 are provided separating six areas within the side walls 21, and forming chambers 25 into which the permanent magnets 8 and pole shoes 20 can be inserted, and secured by screws 19. Parts of partitioning walls 24 and parts of the housing side walls 21 form, together with bottom plate 18, a pot-shaped housing for each magnet 8, 20.

Many modifications of the magnetic system of the present invention are possible, but it is important that a magnetic field of high density is emanated from a portion of the magnet.

It will be understood that each of the elements described above, or two or more together, may also find a useful application in other types of methods of suppressing oscillations differing from the types described above.

While the invention has been illustrated and described as embodied in an apparatus for suppressing oscillations by magnetic attraction of movable machine parts, it is not intended to be limited to the details shown, since various modifications and structural changes may be made without departing in any way from the spirit of the present invention.

Without further analysis, the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for suppressing oscillations in a machine tool having stationary and movable parts, comprising magnetic means for generating a magnetic flux flowing through at least one stationary part and at least one movable part of the machine tool so that said stationary part and said movable part are magnetically attracted to each other.

2. Apparatus as claimed in claim 1, wherein said magnetic means includes at least one portion from which said flux emanates, said portion being spaced from said stationary part and said movable part.

3. Apparatus as claimed in claim 1, wherein said magnetic means include a plurality of magnetic units.

4. Apparatus as claimed in claim 1, wherein said stationary part includes a machine bed; wherein said movable part includes a working table; wherein said magnetic means are mounted on one of said parts; and comprising a magnetizable armature plate secured to the other part and being permeated by the magnetic flux of said magnetic means.

5. Apparatus as claimed in claim 4, wherein said magnetic means are spaced by an air gap from said armature plate.

6. Apparatus as claimed in claim 5, wherein one of said parts includes means for adjusting the width of said air gap between said magnetic means and said armature plate.

7. Apparatus as claimed in claim 5, wherein said one part includes means for adjusting said armature plate relative to said magnetic means for adjusting the width of said air gap.

8. Apparatus as claimed in claim 1, wherein said magnetic means include at least one row of adjacent magnetic units; and comprising control means for selectively energizing a single magnetic unit, a group of magnetic units, and the entire row of magnetic units.

9. Apparatus as claimed in claim 1, wherein said magnetic means include a plurality of magnetic units; and wherein each magnetic unit includes a bottom plate, side wall means and at least one permanent magnet secured to said bottom plate surrounded by said side wall means.

10. Apparatus as claimed in claim 9, wherein each magnetic unit includes a pole show secured to the free end of said permanent magnet and forming an endless air gap with the top end of said side wall means.

11. Apparatus as claimed in claim 10, wherein said pole shoe has an endless ridge; and wherein said top end of said side wall means has an endless ridge, said endless ridges being located on opposite sides of said air gap and having end faces located in a common plane.

12. Apparatus as claimed in claim 1, wherein said magnetic means includes a plurality of magnetic units; and wherein each magnetic unit includes a bottom plate, side walls, a stack of alternating ferromagnetic plates and permanent magnets; and bolt means passing through opposite portions of said side walls and through said stack for securing said stack to said side walls, said opposite portions being ferromagnetic.

13. Apparatus as claimed in claim 12, wherein at least one of said alternating ferromagnetic plates is secured to said bottom plate.

14. Apparatus as claimed in claim 12, wherein said ferromagnetic plates have top ends formed with projecting ridges adjacent said alternating permanent magnets.

15. Apparatus as claimed in claim 1, wherein said magnetic means include a ferromagnetic housing having a bottom plate, side wall means, and a top plate secured to said side wall means, a plurality of permanent magnets arranged in rows and being secured to said bottom plate surrounded by said side wall means, a plurality of pole shoes secured to the top ends of said permanent magnets, respectively; and wherein said top plate has cutouts in which said pole shoes are located, respectively, so that said pole shoes from endless gaps with the edges of said top plate surrounding said cutouts.

16. Apparatus as claimed in claim 15, wherein said edges have projecting ridges forming said endless gaps.

17. Apparatus as claimed in claim 15, wherein said ferromagnetic housing includes partitioning walls for separating said permanent magnets.

18. Apparatus as claimed in claim 17, wherein said top plate is secured to said side walls and to said partitioning walls.

* * * * *